June 5, 1945.  P. F. SPERRY ET AL  2,377,821
ADJUSTABLE VIEW FINDER FOR CAMERAS
Filed Oct. 30, 1941  2 Sheets-Sheet 2
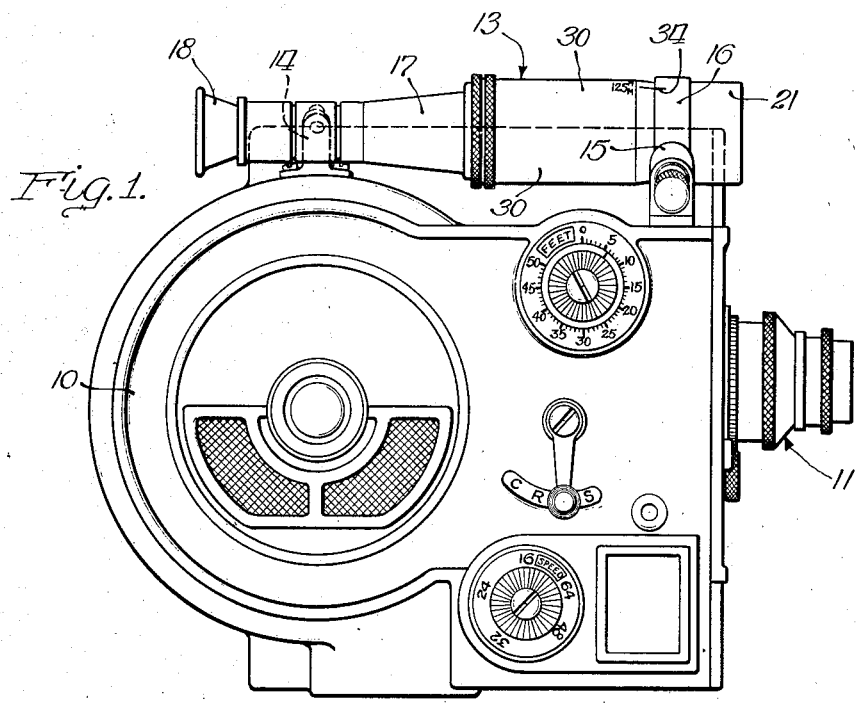
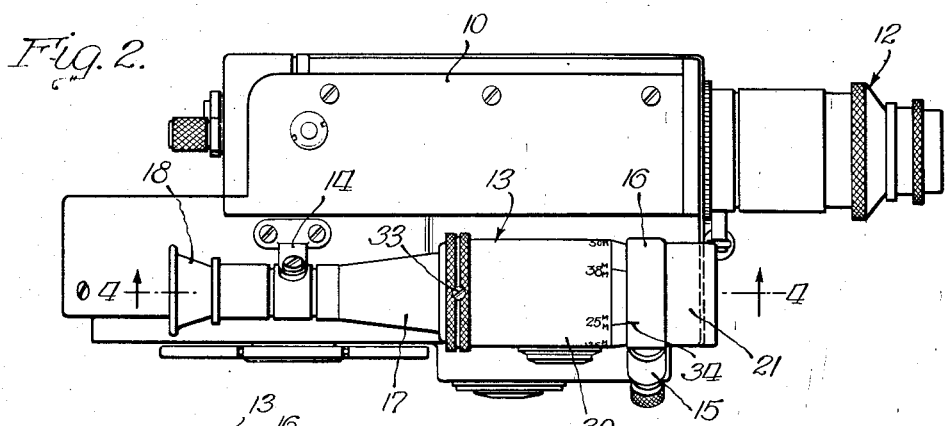
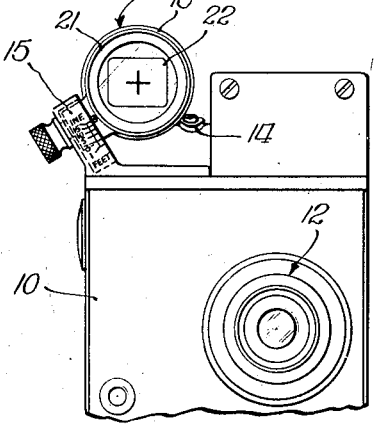
Inventors:
Philmore F. Sperry
Philip F. Briskin
Jack Briskin
By: Zabel Carlson Critchlow & Wells
Attys.

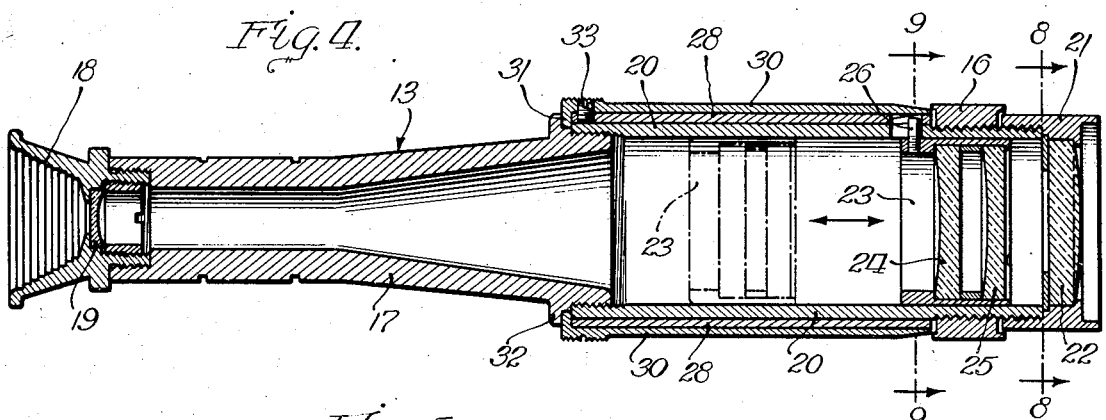
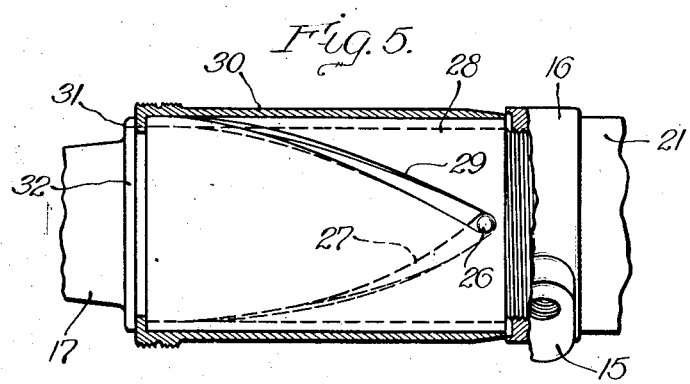
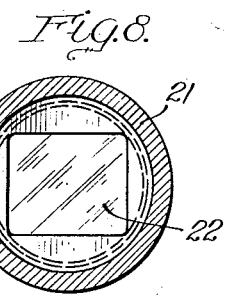
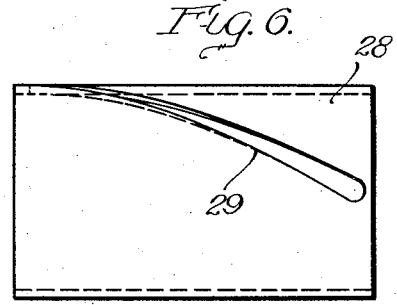
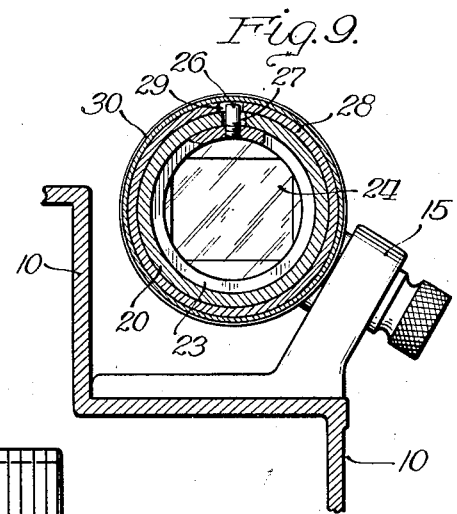
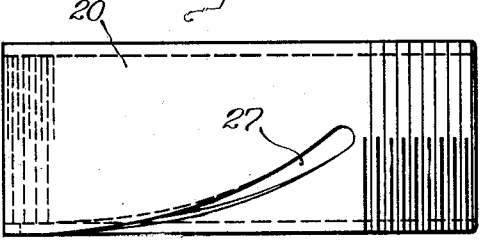

Patented June 5, 1945

2,377,821

UNITED STATES PATENT OFFICE 2,377,821

ADJUSTABLE VIEW FINDER FOR CAMERAS

Philmore F. Sperry, Philip F. Briskin, and Jack Briskin, Chicago, Ill.; Helen B. Sperry, executrix of the estate of said Sperry, deceased; said executrix assignor, by mesne assignments, to Theodore H. Briskin, Philip F. Briskin, and Jack Briskin Application October 30, 1941, Serial No. 417,081

2 Claims. (Cl. 88—1.5)

This invention relates to view finders for cameras of a type adapted to employ interchangeably two or more objectives of different focal length for different classes of work, and it is the object of the invention to provide an improved finder which can be quickly and easily adjusted to accommodate changed conditions as one objective is substituted for another in the camera. In the use of a camera, in many cases the finder is relied upon both for pointing the camera and for showing the limits of the effective coverage of the lens system of the camera. In such cases, it is of course highly important that the finder be arranged so that its field of view shall correspond accurately with the field covered by the camera.

In the preferred form of the invention, the finder includes a housing made up of a plurality of tubular members provided with an eyepiece comprising a suitable lens at the rear end portion of the housing and an objective comprising a second lens at the front end in predetermined fixed spaced relation to said first-named lens, with one or more intermediate lenses movably mounted so as to be adjustable toward and from the objective lens into changed spaced relation thereto. The arrangement is such that the lenses are all fully protected at all times by the tubular housing members, while at the same time the desired adjustment of the intermediate lens or lenses can be effected quickly and easily by any unskilled operator so as to make the field of the finder correspond with the effective field of the camera. In the preferred construction, this adjustment of the finder is effected by a rotary movement of one of the tubular housing members, the parts being graduated for showing the setting required in connection with the finder to suit the different focal length objectives employed in the camera.

It is another object of this invention to improve devices of this type in sundry details hereinafter pointed out. The preferred means by which the several objects have been attained are illustrated in the drawings, in which—

Fig. 1 is a side face view of a camera equipped with the improved view finder of the invention;

Fig. 2 is a top plan view of the parts shown in Fig. 1, but with a different form of objective in the camera;

Fig. 3 is a front face view of the upper portion of the structure as seen from the right in Fig. 2;

Fig. 4 is a central vertical sectional view taken substantially at the line 4—4 of Fig. 2;

Fig. 5 is a top plan view of a portion of the finder as shown in Fig. 4 but with the upper portion of one of the tubular members cut away for clearness of illustration;

Figs. 6 and 7 are top plan views of the spirally slotted tubular members forming parts of the adjusting means for the intermediate lens; and Figs. 8 and 9 are vertical cross sectional views taken substantially at the line 8—8 and the line 9—9, respectively, of Fig. 4.

Referring now to the several figures of the drawings, in which corresponding parts are indicated by the same reference characters, 10 indicates a camera of any approved type having an objective 11 mounted thereon and forming a part thereof as shown in Fig. 1, and an objective 12 of a different focal length in position on the camera in Fig. 2. At the upper face of the camera, a view finder 13 is mounted in position being pivotally supported at its rear end portion by means of a bracket 14 and adjustably supported at its front end by means of a bracket 15.

The form of the view finder is best shown in Fig. 4, which shows also a collar 16 about the finder for supporting it from the bracket 15. As is clearly shown in this figure, the finder comprises a rear sleeve portion 17 provided with an eyepiece 18 at its rear end portion comprising a lens 19. At its forward end, the sleeve 17 is connected by means of screw-threads with an intermediate sleeve 20 which in turn at its front end is provided with an objective comprising a ring 21 and a lens 22. The arrangement is such that the lenses 19 and 22 are held rigidly in fixed spaced relation to each other.

Within the intermediate sleeve 20, an intermediate lens structure is provided comprising a short sleeve 23 having a sliding fit in the sleeve 20, such sleeve 23 being provided with suitable lenses 24 and 25. At its rear end portion, the sleeve 23 is provided with an outwardly extending lug or pin 26 which projects radially through a spiral slot 27 in the wall of the sleeve 20, as is best shown in Fig. 7. About the intermediate sleeve 20, a sleeve 28 is rotatably mounted, provided with an oppositely arranged spiral slot 29 through which also the pin or lug 26 projects. About the sleeve 28 in turn, a sleeve 30 is mounted, such sleeve being provided with an inwardly directed flange 31 at its rear end portion which extends into position between the rear end of the sleeve 20 and a circumferential rib 32 carried by the sleeve 17 so as to hold the sleeve 30 from longitudinal movement with respect to the sleeve 20. The sleeves 28 and 30 are connected rigidly together by means of a machine screw 33.

The sleeve 30 serves primarily as a closure means for covering the obliquely positioned slots 27 and 29 and the operating lug or pin 26 working in said slots. In the arrangement shown, the front end portion of the sleeve 30 is slightly tapered and extends into a recess provided by the slightly undercut rear face portion of the collar 16. As is clearly shown in Fig. 4, the ring or collar 16 is fixedly mounted in position by means of screw-threads upon the front end of the sleeve 20.

As will be readily understood from an inspection of Fig. 5, when the sleeves 30 and 28 are given a rotary movement in clockwise direction in Fig. 9 the pin or lug 26 is forced backwardly, toward the left in Fig. 4, by the camming action of the slots 27 and 29 so as to carry the short sleeve 23 and the intermediate lenses 24 and 25 longitudinally of the sleeve 20 into changed spaced relation to the objective lens 22. The arrangement is such that the sleeves 28 and 30 can be turned readily about the sleeve 20 but that such sleeves 28 and 30 are held by friction yieldingly in any adjusted position to which they are turned.

As is clearly shown in Figs. 1 and 2, the stationary collar 16 is provided with an index point at 34 and the sleeve 30 is graduated with reference to such index point. The graduations are marked in terms of millimeters. The arrangement is such, for example, that when the parts are set at the 25 mm. graduation the intermediate lenses 24 and 25 will be held at such point along the sleeve 20 as to cause the view through the finder under those conditions to correspond in scope with the effective field of the camera when provided with an objective comprising a 25 mm. lens. When a 12½ mm. lens objective is employed on the camera, the sleeve 30 would of course be moved to bring the 12.5 mm. marking opposite to the index 34 for moving the lenses 24 and 25 to proper position for making the field of the finder correspond with the field of the camera.

By the use of the improved arrangement as shown and described, the various lenses of the finder are effectively protected by the continuous housing comprising the several sleeve members. The arrangement is such that the angular position of the view finder with respect to the camera may be changed as desired without in any way affecting the adjustability of the lenses 24 and 25. The arrangement by which the adjustment of the intermediate lenses 24 and 25 is effected by a movement of one housing member with respect to another makes the device very convenient to use so as to enable the adjustment to be effected almost instantly whenever desired. The normal maintenance of the sleeves 28 and 30 in their adjusted position by the frictional engagement of the sleeve 28 with the sleeve 20 is important, there being normally no substantial tendency for displacement of the sleeve 30 from its set position.

While the form as shown and described is preferred, it is to be understood that the invention is not to be limited to the arrangement shown except so far as the claims may be so limited, since changes might well be made in the form of the parts without departing from the invention.

We claim:

1. In a view finder, the combination of a tubular housing comprising an intermediate sleeve portion, a second sleeve rotatably mounted on said first-named sleeve portion so as normally to be held yieldingly by friction in adjusted position circumferentially thereof, an eyepiece mounted at one end portion of said housing, an objective mounted at the opposite end portion of said housing, an intermediate lens slidably mounted in said intermediate sleeve portion between said eyepiece and said objective, and means actuated by a rotary movement of said second sleeve about said intermediate sleeve portion for moving said intermediate lens longitudinally of said intermediate sleeve portion into changed spaced relation to said objective and comprising a lug connected with said intermediate lens and extending outwardly through oppositely arranged spiral slots in the walls of said intermediate sleeve portion and said second sleeve.

2. In a view finder, the combination of a tubular housing comprising an intermediate sleeve portion, a second sleeve rotatably mounted on said first-named sleeve portion so as normally to be held yieldingly by friction in adjusted position circumferentially thereof, an eyepiece mounted at one end portion of said housing, an objective mounted at the opposite end portion of said housing, an intermediate lens slidably mounted in said intermediate sleeve portion between said eyepiece and said objective, a lug connected with said intermediate lens and extending outwardly through oppositely arranged spiral slots in the walls of said intermediate sleeve portion and said second sleeve whereby rotary movement of said second sleeve about said intermediate sleeve portion causes said intermediate lens to move longitudinally of said intermediate sleeve portion into changed spaced relation to said objective, and a third sleeve mounted on said second sleeve so as to cover the spiral slots in the housing walls and fixedly connected with said second sleeve so as to turn therewith, said rotatable third sleeve and a fixed portion of the housing being graduated circumferentially for indicating the longitudinal adjustment of said intermediate lens.

PHILMORE F. SPERRY.
PHILIP F. BRISKIN.
JACK BRISKIN.